(12) United States Patent
Tang

(10) Patent No.: US 10,999,027 B2
(45) Date of Patent: May 4, 2021

(54) METHOD AND DEVICE FOR ELIMINATING INTER-CELL INTERFERENCE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 77 days.

(21) Appl. No.: 16/096,473

(22) PCT Filed: May 24, 2016

(86) PCT No.: PCT/CN2016/083161
§ 371 (c)(1),
(2) Date: Oct. 25, 2018

(87) PCT Pub. No.: WO2017/201674
PCT Pub. Date: Nov. 30, 2017

(65) Prior Publication Data
US 2019/0140789 A1    May 9, 2019

(51) Int. Cl.
*H04B 7/005*    (2006.01)
*H04L 5/00*    (2006.01)
(Continued)

(52) U.S. Cl.
CPC ......... *H04L 5/0032* (2013.01); *H04B 7/2656* (2013.01); *H04J 11/0056* (2013.01);
(Continued)

(58) Field of Classification Search
CPC ........................... H04L 15/073; H04J 11/0056
See application file for complete search history.

(56) References Cited

U.S. PATENT DOCUMENTS

| | | |
|---|---|---|
| 7,593,420 B2 | 9/2009 | Park |
| 9,924,523 B2 | 3/2018 | Lee et al. |

(Continued)

FOREIGN PATENT DOCUMENTS

| | | |
|---|---|---|
| CN | 101820683 A | 9/2010 |
| CN | 104247282 A | 12/2014 |

(Continued)

OTHER PUBLICATIONS

English Translation of Written Opinion of the International Search Authority in the international application No. PCT/CN2016/083161, dated Feb. 24, 2017.

(Continued)

*Primary Examiner* — Bo Hui A Zhu
(74) *Attorney, Agent, or Firm* — Ladas & Parry LLP

(57) ABSTRACT

Disclosed are a method and device for eliminating inter-cell interference, which are applicable to elimination of inter-cell interference cancellation. The method comprises: a first transceiving node obtains interference information of a potential interference cell, wherein the potential interference cell belongs to a second transceiving node, and the interference information of the potential interference cell comprises at least one of the following items: duplex mode information of the potential interference cell, multiple access technique information of the potential interference cell, a physical layer parameter of the potential interference cell in each of at least one first transmission resource pool, and resource allocation information of the potential interference cell in each of at least one second transmission resource pool; and the first transceiving node transmits the interference information of the potential interference cell to a first terminal device.

20 Claims, 5 Drawing Sheets

(51) Int. Cl.
*H04W 72/08* (2009.01)
*H04J 11/00* (2006.01)
*H04L 5/14* (2006.01)
*H04B 7/26* (2006.01)
*H04W 72/04* (2009.01)

(52) U.S. Cl.
CPC ............ *H04L 5/005* (2013.01); *H04L 5/0073* (2013.01); *H04L 5/0092* (2013.01); *H04L 5/14* (2013.01); *H04W 72/048* (2013.01); *H04W 72/0446* (2013.01); *H04W 72/082* (2013.01); *H04L 5/1461* (2013.01)

(56) References Cited

U.S. PATENT DOCUMENTS

| | | | |
|---|---|---|---|
| 2006/0109865 A1 | 5/2006 | Park | |
| 2015/0172035 A1 | 6/2015 | Xu et al. | |
| 2015/0201421 A1* | 7/2015 | Park | H04J 11/0056 455/452.1 |
| 2015/0222304 A1 | 8/2015 | Xu et al. | |
| 2015/0230259 A1 | 8/2015 | Park et al. | |
| 2016/0150548 A1* | 5/2016 | Wu | H04J 11/005 370/329 |
| 2016/0262165 A1 | 9/2016 | Lee et al. | |
| 2017/0064615 A1* | 3/2017 | Im | H04W 48/10 |

FOREIGN PATENT DOCUMENTS

| | | |
|---|---|---|
| CN | 104469815 A | 3/2015 |
| CN | 105144816 A | 12/2015 |
| EP | 1662825 A1 | 5/2006 |
| EP | 1879409 A1 | 1/2008 |
| EP | 2823570 A2 | 1/2015 |
| TW | 201605216 A | 2/2016 |
| WO | 2014136620 A1 | 9/2014 |
| WO | 2015072720 A1 | 5/2015 |

OTHER PUBLICATIONS

Supplementary European Search Report in the European application No. 16902664.8, dated Mar. 4, 2019.
First Office Action in Japanese application No. 2018-556883, dated Dec. 24, 2019.
International Search Report in International application No. PCT/CN2016/083161, dated Feb. 24, 2017.
3rd Generation Partnership Project; Technical Specification Group Radio Access Network; Evolved Universal Terrestrial Radio Access Network(E-UTRAN); X2 application protocol (X2AP)(Release 13); 3GPP TS 36.423 V13.3.0 (Mar. 2016), section 8.3.1.
Office Action of the Indian application No. 201817046327, dated Aug. 28, 2020.
First Office Action of the Taiwanese application No. 106116211, dated Dec. 9, 2020.
First Office Action of the European application No. 16902664.8, dated Feb. 19, 2021.

* cited by examiner

METHOD AND DEVICE FOR ELIMINATING INTER-CELL INTERFERENCE

RELATED APPLICATION

This application is an application under 35 U.S.C. 371 of International Application No. PCT/CN2016/083161 filed on May 24, 2016, the entire contents of which are incorporated herein by reference.

TECHNICAL FIELD

The embodiments of the disclosure relate to communications, and in particular to a method and apparatus for canceling inter-cell interference.

BACKGROUND

The fourth generation (4G) communication system adopts an Orthogonal Frequency Division Multiple Access (OFDMA) scheme, which does not support inter-cell interference suppression. Therefore, Inter-Cell Interference Coordination (ICIC) is introduced. ICIC can only achieve good interference coordination in a system with a lighter load, and it is difficult to obtain a gain when the number of users is large and the system capacity is saturated. The fifth generation (5G) communication system will adopt an ultra-dense networking and network slicing scheme. Different network slices may use different time-frequency resources and have different transmission technologies (such as a duplex mode and a multiple access scheme) and different physical layer parameters (such as subcarrier spacing, frame structures, and common channel switches), and may be carried by different types of network nodes (such as 4G base stations, 5G base stations, relay stations, and device-to-device communication nodes). Therefore, in a scenario of ultra-dense networking, multiple cells corresponding to different network slices may overlap at one geographic location, causing inter-cell interference. How to cancel inter-cell interference in this scenario is an urgent technical problem to be solved.

SUMMARY

The embodiments of the disclosure provide a method and apparatus for canceling inter-cell interference, which are applicable to inter-cell interference cancellation.

A first aspect provides a method for canceling inter-cell interference. A first Transmission and Reception Point (TRP) acquires interference information of a potential interference cell. The potential interference cell belongs to a second TRP. The interference information of the potential interference cell includes at least one of: duplex mode information of the potential interference cell, multiple access scheme information of the potential interference cell, a physical layer parameter of the potential interference cell in each of at least one first transmission resource pool, and resource allocation information of the potential interference cell in each of at least one second transmission resource pool. The first TRP transmits the interference information of the potential interference cell to a first terminal device.

Alternatively, the potential interference cell may be a potential interference cell of a first terminal device serving the first TRP.

Alternatively, data transmission between the potential interference cell and a second terminal device served by the potential interference cell currently interferes with or may interfere with data transmission between the first TRP and the first terminal device.

Therefore, according to the method for canceling inter-cell interference in the embodiment of the disclosure, a second TRP transmits interference information of a potential interference cell to a first TRP, the first TRP transmits, to a first terminal device, the received interference information of each of at least one potential interference cell, and the first terminal device performs interference cancellation according to the received interference information of the at least one potential interference cell, which is beneficial to achieve inter-cell interference cancellation and improve system performance.

In a first possible implementation manner of the first aspect, the operation that the first TRP acquires interference information of a potential interference cell includes that: the first TRP receives interference information of the potential interference cell transmitted by a second TRP to which the potential interference cell belongs.

In conjunction with the foregoing possible implementation manner, in a second possible implementation manner of the first aspect, before the first TRP receives interference information of the potential interference cell transmitted by a second TRP to which the potential interference cell belongs, the method further includes that: the first TRP transmits an invoke indication to the second TRP, the invoke indication being used for invoking the second TRP to transmit interference information of the potential interference cell in at least one target transmission resource pool. The operation that the first TRP receives interference information of the potential interference cell transmitted by a second TRP to which the potential interference cell belongs includes that: the first TRP receives interference information of the potential interference cell in each of the at least one target transmission resource pool, which is transmitted by the second TRP according to the invoke indication.

In this way, a first TRP invokes interference information (such as a transmission scheme and/or a physical layer parameter) of a second TRP (or a target cell of the second TRP) within a target transmission resource range in an invoke indication transmitted to the second TRP, such that the second TRP may transmit only the interference information of the second TRP (or the target cell of the second TRP) within the target transmission resource range to the first TRP without feeding back the interference information of the second TRP (or the target cell of the second TRP) over all transmission resource ranges, thereby reducing signaling overhead.

In addition, the first TRP may perform resource scheduling according to the target transmission resource range indicated in the invoke indication, and align the resource allocation of the first TRP with the resource allocation of the second TRP as far as possible, thereby reducing the complexity of an inter-cell interference cancellation algorithm.

A second aspect provides another method for canceling inter-cell interference. A first terminal device receives interference information of a potential interference cell transmitted by a first TRP, the interference information of the potential interference cell including at least one of: duplex mode information of the potential interference cell, multiple access scheme information of the potential interference cell, a physical layer parameter of the potential interference cell in each of at least one first transmission resource pool, and resource allocation information of the potential interference cell in each of at least one second transmission resource pool. The first terminal device performs interference cancellation on a signal received from the first TRP according to the interference information of the potential interference cell.

A third aspect provides another method for canceling inter-cell interference. The method includes that: a second TRP determines interference information of a first cell. The first cell belongs to the second TRP, and the interference information of the first cell includes at least one of: duplex mode information of the first cell, multiple access scheme information of the first cell, a physical layer parameter of the first cell in each of at least one first transmission resource pool, and resource allocation information of the first cell in each of at least one second transmission resource pool; and the second TRP transmits the interference information of the first cell to a first TRP.

Alternatively, the first cell may belong to the second TRP, and the first cell may be a potential interference cell of a first terminal device serving the first TRP.

Alternatively, the duplex mode information of the first cell includes: information about a duplex mode adopted by the first cell in each of at least one third transmission resource pool.

Alternatively, the multiple access scheme information of the first cell includes: information about a multiple access scheme adopted by the first cell in each of at least one fourth transmission resource pool.

Alternatively, the resource allocation information of the first cell in the second transmission resource pool includes at least one of: configuration information of a User Equipment (UE)-specific reference signal of each of at least one second terminal device served by the first cell in the second transmission resource pool, configuration information of a UE-specific control channel of each second terminal device in the second transmission resource pool, and information about a transmission resource allocated to each second terminal device by the first cell in the second transmission resource pool.

Alternatively, before the second TRP transmits the interference information of the first cell to a first TRP, the method further includes that: the second TRP receives an invoke indication transmitted by the first TRP, the invoke indication being used for invoking the second TRP to transmit the interference information of the first cell in at least one target transmission resource pool. The operation that the second TRP transmits the interference information of the first cell to a first TRP includes that: the second TRP transmits the interference information of the first cell in each of the at least one target transmission resource pool to the first TRP according to the invoke indication. The interference information of the potential interference cell in the target transmission resource pool includes at least one of: duplex mode information of the potential interference cell in the target transmission resource pool, multiple access scheme information of the potential interference cell in the target transmission resource pool, a physical layer parameter of the potential interference cell in the target transmission resource pool, and resource allocation information of the potential interference cell in the target transmission resource pool.

In some aspects of the disclosure, alternatively, the at least one first transmission resource pool may be all or part of transmission resource pools allocated to the potential interference cell.

In some aspects of the disclosure, alternatively, the at least one second transmission resource pool may be all or part of transmission resource pools allocated to the potential interference cell.

In some aspects of the disclosure, the duplex mode information of the potential interference cell includes: information about a duplex mode adopted by the potential interference cell in each of at least one third transmission resource pool.

In some aspects of the disclosure, alternatively, the duplex mode may be one of the following: frequency division duplex, time division duplex, Device to Device (D2D), and full duplex.

In some aspects of the disclosure, alternatively, the at least one third transmission resource pool may be all or part of transmission resource pools allocated to the potential interference cell.

In some aspects of the disclosure, alternatively, the multiple access scheme information of the potential interference cell includes: information about a multiple access scheme adopted by the potential interference cell in each of at least one fourth transmission resource pool.

In some aspects of the disclosure, alternatively, the multiple access scheme may be one of: OFDMA, filtered OFDMA, Code Division Multiple Access (CDMA), and non-orthogonal multiple access schemes.

In some aspects of the disclosure, alternatively, the at least one fourth transmission resource pool may be all or part of transmission resource pools allocated to the potential interference cell.

In some aspects of the disclosure, alternatively, the physical layer parameter includes at least one of: a multiple access scheme basic transmission parameter, a frame structure parameter, and a subframe structure parameter.

In some aspects of the disclosure, alternatively, the frame structure parameter includes at least one of: a subframe length, a slot length, an intra-frame uplink and downlink resource configuration, an intra-frame Common Reference Signal (CRS) configuration, an intra-frame common channel configuration, and an intra-frame control channel configuration.

In some aspects of the disclosure, alternatively, the subframe structure parameter includes at least one of: an intra-subframe uplink and downlink resource configuration, an intra-subframe common channel configuration, and an intra-subframe control channel configuration.

In some aspects of the disclosure, alternatively, the resource allocation information of the potential reference cell in the second transmission resource pool includes at least one of: configuration information of a UE-specific reference signal of each of at least one second terminal device served by the potential reference cell in the second transmission resource pool, configuration information of a UE-specific control channel of each second terminal device in the second transmission resource pool, and information about a transmission resource allocated to each second terminal device by the potential reference cell in the second transmission resource pool.

In some aspects of the disclosure, alternatively, the interference information of the potential interference cell in a target transmission resource pool includes at least one of: duplex mode information of the potential interference cell in the target transmission resource pool, multiple access scheme information of the potential interference cell in the target transmission resource pool, a physical layer parameter of the potential interference cell in the target transmission resource pool, and resource allocation information of the potential interference cell in the target transmission resource pool.

A fourth aspect provides an apparatus for canceling inter-cell interference, configured to perform the method in the first aspect or any possible implementation manner of the first aspect. Specifically, the apparatus may include a unit for performing the method in the first aspect or any possible implementation manner of the first aspect.

A fifth aspect provides an apparatus for canceling inter-cell interference, configured to perform the method in the second aspect or any possible implementation manner of the second aspect. Specifically, the apparatus may include a unit for performing the method in the second aspect or any possible implementation manner of the second aspect.

A sixth aspect provides an apparatus for canceling inter-cell interference, configured to perform the method in the third aspect or any possible implementation manner of the third aspect. Specifically, the apparatus may include a unit for performing the method in the third aspect or any possible implementation manner of the third aspect.

A seventh aspect provides an apparatus for canceling inter-cell interference, including: a storage unit and a processor, the storage unit being configured to store an instruction, the processor being configured to execute an instruction stored in the storage unit. When the processor executes the instruction stored in the storage unit, the processor is enabled to perform the method in the first aspect or any possible implementation manner of the first aspect.

An eighth aspect provides an apparatus for canceling inter-cell interference, including: a storage unit and a processor, the storage unit being configured to store an instruction, the processor being configured to execute an instruction stored in the storage unit. When the processor executes the instruction stored in the storage unit, the processor is enabled to perform the method in the second aspect or any possible implementation manner of the second aspect.

A ninth aspect provides an apparatus for canceling inter-cell interference, including: a storage unit and a processor, the storage unit being configured to store an instruction, the processor being configured to execute an instruction stored in the storage unit. When the processor executes the instruction stored in the storage unit, the processor is enabled to perform the method in the third aspect or any possible implementation manner of the third aspect.

A tenth aspect provides a computer-readable storage medium for storing a computer program, the computer program including an instruction for performing the method in the first aspect or any possible implementation manner of the first aspect. An eleventh aspect provides a computer-readable storage medium for storing a computer program, the computer program including an instruction for performing the method in the second aspect or any possible implementation manner of the second aspect.

A twelfth aspect provides a computer-readable storage medium for storing a computer program, the computer program including an instruction for performing the method in the third aspect or any possible implementation manner of the third aspect.

A thirteenth aspect provides a wireless communication system, including the apparatus in the fourth aspect or any possible implementation manner of the fourth aspect, the apparatus in the fifth aspect or any possible implementation manner of the fifth aspect, and the apparatus in the sixth aspect or any possible implementation manner of the sixth aspect. Alternatively, the wireless communication system may include the apparatus in the seventh aspect or any possible implementation manner of the seventh aspect, the apparatus in the eighth aspect or any possible implementation manner of the eighth aspect, and the apparatus in the ninth aspect or any possible implementation manner of the ninth aspect.

BRIEF DESCRIPTION OF DRAWINGS

In order to describe the technical solutions in the embodiments of the disclosure more clearly, the drawings required to be used in descriptions about the embodiments of the disclosure or the conventional art will be simply introduced below. Obviously, the drawings in the following descriptions are only some embodiments of the disclosure. Those of ordinary skilled in the art may further obtain other drawings according to these drawings without creative work.

DETAILED DESCRIPTION

The technical solutions in the embodiments of the disclosure are clearly and completely described in the following with reference to the accompanying drawings in the embodiments of the disclosure. It is apparent that the described embodiments are a part of the embodiments of the disclosure, but not all of the embodiments. All other embodiments obtained by those skilled in the art based on the embodiments of the disclosure without creative efforts fall within the scope of protection of the disclosure.

It should be understood that the terms "system" and "network" are used interchangeably herein. The term "and/or" herein is merely an association describing associated objects, indicating that there may be three relationships. For example, A and/or B may indicate that A exists separately, both A and B exist simultaneously, and B exists separately. In addition, the character "/" herein generally indicates that the contextual object is an "or" relationship.

Figure 1:
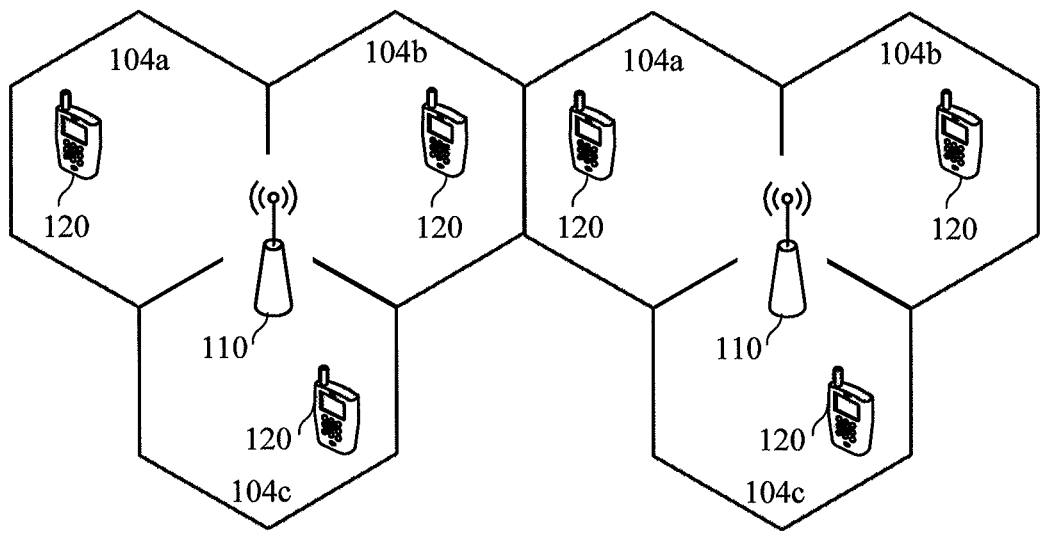
FIG. 1 is a schematic structural diagram of a wireless communication system to which an embodiment of the disclosure is applied.

FIG. 1 is a schematic structural diagram of a wireless communication system 100 to which an embodiment of the disclosure may be applied. The wireless communication system 100 may be a Global System of Mobile communication (GSM), a CDMA system, a Wideband Code Division Multiple Access (WCDMA) system, General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system or a future 5G system.

As shown in FIG. 1, the wireless communication system 100 includes multiple TRPs 110 and multiple terminal devices 120. For the sake of brevity, only two TRPs are shown here, but the embodiment of the disclosure does not limit the number of TRPs. Each TRP may provide communication coverage for a specific geographic area, the coverage area of the TRP may be divided into multiple smaller areas, and each smaller area may be called a cell. FIG. 1 exemplarily shows that the coverage area of a TRP 110 is divided into three cells 104a, 104b, and 104c. However, in the embodiment of the disclosure, one TRP may support one or more cells, which is not limited in the embodiment of the disclosure.

FIG. 1 also shows multiple terminal devices 120 located within the coverage range of a TRP. For the sake of brevity, only one terminal device in each cell is exemplarily shown here, but the embodiment of the disclosure does not limit the number of terminal devices in the cell.

In the embodiment of the disclosure, the TRP may be connected to the terminal device located within the coverage range by a wireless connection or a wired connection or other manners, and the TRP may support simultaneous transmission of multiple cellular carriers. As an alternative example, the TRP and the terminal device may communicate through an air interface (such as a Uu interface), and a communication link from the TRP to the terminal device is called a Downlink (DL), a communication link from the terminal device to the TRP may be called an Uplink (UL), and different TRPs may communicate through a network interface (such as an X2 interface).

Alternatively, in the embodiment of the disclosure, the connection relationship between different TRPs may be a homogeneous scenario, or a heterogeneous scenario with a non-ideal connection, or may be heterogeneous scenario with a fiber access connection. The embodiment of the disclosure is not limited thereto.

In the embodiment of the disclosure, the terminal device may refer to an access terminal, a UE, a user unit, a user station, a mobile radio station, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device or other processing devices connected to a wireless modem, an in-vehicle device, a wearable device, a terminal device in a future 5G network, or a terminal device in a future evolved Public Land Mobile Network (PLMN).

In the embodiment of the disclosure, the TRP may be a device for communicating with the terminal device, the TRP may be a Base Transceiver Station (BTS) in a GSM or a CDMA system, or may be a NodeB (NB) in a WCDMA system, or may be an Evolutional NodeB (eNB or eNodeB) in an LTE system, or a wireless controller in a Cloud Radio Access Network (CRAN). Or, the TRP may be a relay station, an access point, an in-vehicle device, a wearable device, a network side device in a future 5G network, or a point in a future evolved PLMN.

The wireless communication system 100 may also include other network devices. For the sake of brevity, it is not shown in FIG. 1, but the embodiment of the disclosure is not limited thereto.

In the wireless communication system 100, a TRP may adopt different transmission schemes in a cell managed by the TRP. For example, different duplex modes and multiple access schemes are adopted, and different PHY parameters may be adopted. For example, different subcarrier spacings, chip rates, frame structures or the like are adopted. In addition, the TRP may also use different transmission schemes and PHY parameters over different time frequency resources in a cell. The embodiment of the disclosure is not limited thereto.

Figure 2:
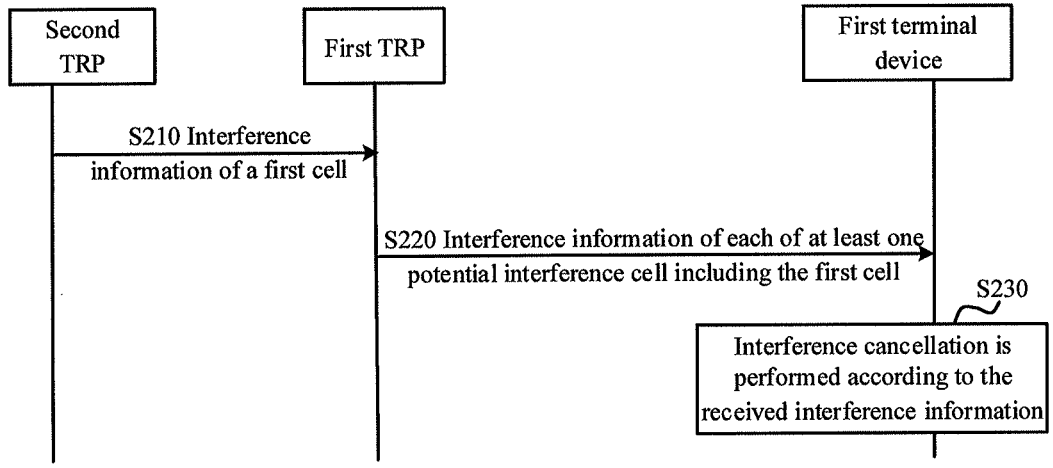
FIG. 2 is a schematic flowchart of a method for canceling inter-cell interference according to an embodiment of the disclosure.

FIG. 2 shows a method 200 for canceling inter-cell interference according to an embodiment of the disclosure. The method 200 may be applied to various wireless communication systems, for example, to the wireless communication system 100 as shown in FIG. 1, but the embodiment of the disclosure is not limited thereto.

At S210, a second TRP transmits interference information of a first cell to a first TRP. The first cell belongs to the second TRP.

The first cell may be a potential interference cell of a first terminal device. A current serving cell of the first terminal device may belong to the first TRP. The potential interference cell of the first terminal device may be a neighboring cell of the current serving cell of the first terminal device, the potential interference cell may be a cell currently interfering with the first terminal device, or may be a cell that may interfere with the first terminal device. The embodiment of the disclosure is not limited thereto.

The first cell belongs to a second TRP, and the first cell may specifically refer to one or more cells. If the first cell specifically refers to multiple cells, interference information of the first cell may include interference information of each cell in the multiple cells. The embodiment of the disclosure is not limited thereto.

In the embodiment of the disclosure, the first cell may be configured with one or more transmission resource pools, and each transmission resource pool may correspond to a transmission resource set constituted by available transmission resources of the first cell. The available transmission resources may include available time frequency resources, code domain resources and/or space domain resources or the like. The embodiment of the disclosure is not limited thereto.

Alternatively, the interference information of the first cell may include at least one of the following information: duplex mode information of the first cell, multiple access scheme information of the first cell, a physical layer parameter of the first cell in each of at least one first transmission resource pool, and resource allocation information of the first cell in each of at least one second transmission resource pool.

Alternatively, any first transmission resource pool in the at least one first transmission resource pool may be different from any second transmission resource pool in the at least one second transmission resource pool, that is, the at least one first transmission resource pool and the at least one second transmission resource pool do not intersect; or, a part of the first transmission resource pool in the at least one first transmission resource pool may be the same as a part of the second transmission resource in the at least one second transmission resource pool, and the remaining part of the first transmission resource pool is different from the remaining part of the second transmission resource pool, that is, the at least one first transmission resource pool and the at least one second transmission resource pool may partially intersect; or, the at least one first transmission resource pool and the at least one second transmission resource pool may be the same in one-to-one correspondence, that is, the at least one first transmission resource pool and the at least one second transmission resource pool may be completely coincident with each other, for example, the at least one first transmission resource pool and the at least one second transmission resource pool are all transmission resource pools allocated to the first cell, but the embodiment of the disclosure is not limited to this.

Specifically, the duplex mode information of the first cell may be used to indicate a duplex mode adopted by the first cell. Alternatively, the duplex mode may be any one of the following: frequency division duplex, time division duplex, D2D, or full duplex. The embodiment of the disclosure is not limited thereto.

Alternatively, the first cell may adopt the same duplex mode in all the transmission resource pools of the first cell. At this time, the duplex mode information of the first cell may be specifically used to indicate a unique duplex mode adopted by the first cell in all the transmission resource pools, that is, there is one duplex mode indicated by the duplex mode information, and the duplex mode may be applied to all transmission resource sets of the first cell. Alternatively, the first cell may also adopt different duplex modes in different transmission resource pools. At this time, the duplex mode information of the first cell may be specifically used to indicate a duplex mode adopted by the first cell in each third transmission resource pool in at least one third transmission resource pool. The at least one third transmission resource pool may be part or all of the transmission resource pools of the first cell, that is, the duplex mode information of the first cell may be specifically used to indicate at least one duplex mode corresponding to the at least one third transmission resource pool of the first cell, and each duplex mode may be applicable only to the third transmission resource pool corresponding thereto. The embodiment of the disclosure is not limited thereto.

As another alternative embodiment, the interference information of the first cell may also include the duplex mode information of the first cell not explicitly, but may implicitly indicate a duplex mode adopted by the first cell by other means. For example, a physical layer parameter of the first cell (or a certain transmission resource pool of the first cell) may implicitly indicate a duplex mode adopted by the first cell (or the first cell in the transmission resource pool). As an alternative example, if the physical layer parameter of the first cell includes an uplink and downlink subframe or a symbol ratio of the first cell (or a certain transmission resource pool of the first cell), it may be indicated that a duplex mode adopted by the first cell (or the first cell in the transmission resource pool) is TDD; if the physical layer parameter of the first cell does not include the uplink subframe or symbol ratio of the first cell (or a certain transmission resource pool of the first cell), it may be indicated that a duplex mode adopted by the first cell (or the first cell in the transmission resource pool) is FDD, but the embodiment of the disclosure is not limited thereto.

The multiple access scheme information of the first cell may be used to indicate a multiple access scheme adopted by the first cell. Alternatively, the multiple access scheme may specifically be any one of the following: OFDMA, filtered OFDMA, CDMA, or a non-orthogonal multiple address scheme or the like. The embodiment of the disclosure is not limited thereto.

Alternatively, the first cell may adopt the same multiple address scheme in all the transmission resource pools of the first cell. At this time, the multiple address scheme information of the first cell may be specifically used to indicate a unique multiple address scheme adopted by the first cell in all the transmission resource pools, that is, there is one multiple address scheme indicated by the multiple address scheme information, and the multiple address scheme may be applied to all transmission resource pools of the first cell. Alternatively, the first cell may also adopt different multiple address schemes in different transmission resource pools. At this time, the multiple address scheme information of the first cell may be specifically used to indicate a multiple address scheme adopted by the first cell in each fourth transmission resource pool in at least one fourth transmission resource pool. The at least one fourth transmission resource pool may be part or all of the transmission resource pools of the first cell, that is, the multiple address scheme information of the first cell may be specifically used to indicate at least one multiple address scheme corresponding to the at least one fourth transmission resource pool of the first cell, and each multiple address scheme may be applicable only to the fourth transmission resource pool corresponding thereto. The embodiment of the disclosure is not limited thereto.

As another alternative embodiment, the interference information of the first cell may also include the multiple address scheme information of the first cell not explicitly, but may implicitly indicate a multiple address scheme adopted by the first cell by other means. For example, a physical layer parameter of the first cell (or a certain transmission resource pool of the first cell) may implicitly indicate a multiple address scheme adopted by the first cell (or the first cell in the transmission resource pool). As an alternative example, if the physical layer parameter of the first cell includes a subcarrier spacing of the first cell (or a certain transmission resource pool of the first cell), it is indicated that a multiple address scheme adopted by the first cell (or the first cell in the transmission resource pool) is OFDMA; or, if the physical layer parameter of the first cell includes a chip rate of the first cell (or a certain transmission resource pool of the first cell), it is indicated that a multiple address scheme adopted by the first cell (or the first cell in the transmission resource pool) is CDMA, but the embodiment of the disclosure is not limited thereto.

It should be understood that in the embodiment of the disclosure, the terms "first", "second", "third", and "fourth" are merely used to distinguish different contents, and should not be construed as limiting the embodiment of the disclosure. Specifically, the "transmission resource pool" is defined by "first", "second", "third", and "fourth", only for convenience of describing transmission resource pools that may be different, and not necessarily indicating different transmission resource pools. Alternatively, any two different sets of the at least one first transmission resource pool, the at least one second transmission resource pool, the at least one third transmission resource pool and the at least one fourth transmission resource pool may not intersect at all, may partially intersect or may completely overlap. The embodiment of the disclosure is not limited thereto.

The physical layer parameter of the first cell may specifically refer to a transmission parameter adopted by the first cell in a specific duplex mode and/or multiple access scheme. Alternatively, the physical layer parameter may include a basic transmission parameter. The basic transmission parameter may depend on a multiple access scheme adopted by the first cell. For example, if the multiple access scheme adopted by the first cell is OFDMA, the basic transmission parameter may include a subcarrier spacing; if the multiple access scheme is CDMA, the basic transmission parameter may include a chip rate; if the multiple access scheme is Filtered-OFDMA, the basic transmission parameter may include a filtered waveform parameter, but the embodiment of the disclosure is not limited to this.

Alternatively, the physical layer parameter may also include a frame structure parameter, used for indicating a frame structure configuration of the first cell. Alternatively, the frame structure parameter may include a subframe or a slot length. In this case, the second TRP may adopt different subframes or slot lengths in different cells, but the embodiment of the disclosure is not limited thereto. Alternatively, the frame structure parameter may also include an intra-frame uplink and downlink configuration, and may be specifically used to indicate a transmission resource occupied by the intra-frame uplink and downlink respectively, such as a time domain resource, a frequency domain resource, and a code domain resource. Alternatively, the frame structure parameter may also include a configuration of an intra-frame CRS, which may be specifically used to indicate a transmission resource occupied by the reference signal. Alternatively, the frame structure parameter may also include an intra-frame common channel configuration and/or a control channel configuration. The control channel configuration may include a common control channel configuration and/or a dedicated control channel configuration. Specifically, the intra-frame common channel configuration may be used to indicate at least one of a time domain resource, a frequency domain resource, a code domain resource, and a space domain resource occupied by a control channel in a radio frame. The intra-frame control channel configuration may be used to indicate at least one of a time domain resource, a frequency domain resource, a code domain resource, and a space domain resource occupied by a control channel in a radio frame, but the embodiment of the disclosure is not limited thereto.

Alternatively, the physical layer parameter may also include a subframe structure parameter, used for indicating a subframe structure configuration of the first cell. Alternatively, the subframe structure parameter may include an intra-subframe uplink and downlink transmission resource configuration, an intra-subframe common channel configuration and an intra-subframe control channel configuration, and may be, for example, used to indicate at least one of a time domain resource, a frequency domain resource, a code domain resource, and a space domain resource occupied by a common channel and/or a control channel in a subframe. The embodiment of the disclosure is not limited thereto.

Alternatively, the first cell may adopt the same physical layer parameter in all the transmission resource pools. In this case, the interference information of the first cell may include the physical layer parameter adopted by the first cell in all the transmission resource pools, that is, the interference information may include only one physical layer parameter set. Or, the first cell may also adopt different physical layer parameters in different transmission resource pools. In this case, the interference information of the first cell may specifically include the physical layer parameter adopted by the first cell in each of the at least one first transmission resource pool. Different first transmission resource pools correspond to the same type or different types of physical layer parameters, that is, the interference information of the first cell may include at least one physical layer parameter set in one-to-one correspondence to at least one first transmission resource pool of the first cell. The embodiment of the disclosure is not limited thereto.

Alternatively, in the embodiment of the disclosure, the interference information of the first cell may further include resource allocation information of each second transmission resource pool in one or more second transmission resource pools of the first cell. The resource allocation information of the transmission resource pool may be used to indicate the allocation of transmission resources in the transmission resource pool by the first cell. For example, the resource allocation information may be specifically used to indicate that the first cell allocates a transmission resource in the transmission resource pool to each second terminal device in at least one second terminal device serving the first cell, wherein data transmission between the first cell and the second terminal device currently interferes with or may interfere with data transmission between the first TRP and the first terminal device. Alternatively, the resource allocation information of the transmission resource pool may include at least one of the following: configuration information of a UE-specific reference signal of each second terminal device in the transmission resource pool, configuration information of a UE-specific control channel of each second terminal device in the transmission resource pool, and information about a transmission resource occupied by each second terminal device in the transmission resource pool. Alternatively, the resource allocation information of the transmission resource pool may further include other pieces of information. The embodiment of the disclosure is not limited thereto.

The configuration information of the UE-specific reference signal of the second terminal device in the transmission resource pool may be used to indicate the transmission resource occupied by the UE-specific reference signal of the second terminal device in the transmission resource pool. The configuration information of the UE-specific control channel of the second terminal device in the transmission resource pool may be used to indicate the transmission resource occupied by the UE-specific control channel of the second terminal device in the transmission resource pool. Alternatively, the resource allocation information of the transmission resource pool may further include a transmission parameter of the second terminal device in the transmission resource pool. The transmission parameter may include one or more of a Multiple Input Multiple Output (MIMO) parameter, a modulation coding format, a spreading code, a scrambling code or the like. The embodiment of the disclosure is not limited thereto.

In the conventional art, if cell 1 belonging to TRP1 provides service for terminal device 1, and cell 1 belonging to TRP1 is within a time-frequency resource range allocated to terminal device 1, cell 2 belonging to TRP2 allocates transmission resources to terminal device 2 and terminal device 3. In this way, a signal transmitted by TRP2 to terminal device 2 or terminal device 3 interferes with a signal transmitted by TRP1 to terminal device 1, and the signals transmitted by TRP2 to terminal device 2 and terminal device 3 are respectively encoded. Correspondingly, decoding and interference reconstruction must be performed separately. Therefore, terminal device 1 must know that the received interference includes signals from several terminal devices and the boundary of time-frequency resources occupied by these terminal devices, and this is very difficult to achieve. In this way, resources occupied by coded codewords of a terminal device in an interfering cell cannot completely overlap with resources occupied by coded codewords of a terminal device in a serving cell, causing that the interfered terminal device cannot perform interference cancellation. In the embodiment of the disclosure, the information of a time-frequency resource allocated to a relevant terminal device by the interfering cell is transmitted to the serving cell of the interfered terminal device, and then transmitted by the serving cell to the interfered terminal device, so that the interfered terminal device may perform, according to the information, decoding and interference reconstruction on the received signal to achieve interference cancellation. For example, in the above example, although the time-frequency resource range of terminal device 2 and terminal device 3 exceeds the time-frequency resource range of terminal device 1, after terminal device 1 reconstructs the interference signals of terminal device 2 and terminal device 3, the interference cancellation can be achieved as long as a part overlapping with the own time-frequency resource is subtracted. For example, assuming that the frequency domain range of a signal needing to be received by terminal device 1 is 3-5 MHz, a signal transmitted by the interfering cell to terminal device 2 covers 2-4 MHz, and a signal transmitted by the interfering cell to terminal device 3 covers 4-6 MHz. In this case, the frequency domain range of the interference to be subtracted by terminal device 1 is 3-5 MHz, but since this part of the interference is composed of signals transmitted to the two terminal devices, reconstruction is required separately. Specifically, terminal device 1 may reconstruct the interference within the frequency domain range of 2-4 MHz, and then subtract the part of 3-4 MHz; and terminal device 1 may reconstruct the interference within the frequency domain range of 4-6 MHz, and then subtract the part of 4-5 MHz. The embodiment of the disclosure is not limited thereto.

Alternatively, the interference information of the first cell may further include a cell identifier of the first cell, or may further include other pieces of information. The embodiment of the disclosure is not limited thereto.

As another alternative embodiment, the second TRP may further transmit an invoke indication to the first TRP. The invoke indication may be used to invoke the first TRP to transmit interference information of each target cell in at least one target cell of the first TRP to the second TRP. Alternatively, the invoke indication may include information about a cell identifier of a target cell and a target transmission resource pool and/or a target time-frequency resource of the target cell, to invoke the first TRP to transmit interference information of the target cell over the target transmission resource pool and/or the target time-frequency resource. Alternatively, the invoke indication may further include at least one of a transmission scheme indication, a physical layer parameter indication, and a resource allocation indication. The transmission scheme indication may be used to invoke the first TRP to transmit target cell transmission scheme information. Correspondingly, the first TRP may transmit, according to the transmission scheme indication, information about a transmission scheme adopted by the target cell over the target transmission resource pool and/or the target time-frequency resource to the second TRP. The physical layer parameter indication may be used to invoke the first TRP to transmit a physical layer parameter of a target cell. Correspondingly, the first TRP may transmit, according to the physical layer parameter indication, a physical layer parameter adopted by the target cell over the target transmission resource pool and/or the target time-frequency resource to the second TRP. The resource allocation indication may be used to invoke the first TRP to transmit resource allocation information of a target cell. Correspondingly, the first TRP may transmit, according to the resource allocation indication, resource allocation information adopted by the target cell over the target transmission resource pool and/or the target time-frequency resource to the second TRP. Alternatively, the invoke indication may further include other pieces of information. The embodiment of the disclosure is not limited thereto.

Alternatively, the second TRP may carry the interference information of the first cell and the invoke indication in the same or different messages. The embodiment of the disclosure is not limited thereto.

In the embodiment of the disclosure, the second TRP may transmit the interference information of the first cell to the first TRP through a network interface between the second TRP and the first TRP. As an alternative embodiment, the interference information transmitted on the network interface may have the format shown in Table 1.

TABLE 1

Example of interference information format transmitted on network interface
Interference information > Cell identifier #1
  >> Transmission scheme and physical layer parameter of resource pool #1
    >>> Time-frequency resource information of resource pool #1
    >>> Transmission scheme of resource pool #1
      >>>> Duplex mode
      >>>> Multiple access scheme
    >>> Physical layer parameter of resource pool #1
      >>>> Subcarrier spacing of an OFDMA scheme (if a multiple access scheme is OFDMA)
      >>>> Chip rate of an ODMA scheme (if a multiple access scheme is ODMA)
      >>>> Filter configuration of a Filtered-OFDMA scheme (if a multiple access scheme is Filtered-OFDMA)
      >>>> Configuration of a non-orthogonal multiple access scheme (if a multiple access scheme is non-orthogonal multiple access)
      >>>> Frame structure
        >>>>> Subframe/slot length
        >>>>> CRS configuration
        >>>>> Common control channel configuration
      >>>> Subframe structure
        >>>>> Intra-subframe uplink and downlink configuration
        >>>>> Intra-subframe common control channel configuration
    >>> UE-specific resource allocation of resource pool #1
      >>>> UE#1
        >>>>> UE-specific reference signal configuration
        >>>>> UE-specific control channel configuration
        >>>>> Resource allocation of transmission block #1
        >>>>> Resource allocation of transmission block #2
        >>>>> ......

TABLE 1-continued

Example of interference information format transmitted on network interface
Interference information >>>> UE #2
>>>> ......
>> Transmission scheme and physical layer parameter of resource pool #2
>> .......
> Cell identifier #2
> ......
> Invoke indication
   >> Target cell identifier #1
      >>> Target resource area
      >>> Transmission scheme
      >>> Physical layer parameter
      >>> UE-specific resource allocation
   >> Target cell identifier #2 ......
   >> .......

It should be understood that Table 1 exemplarily shows the format of the interference information. Alternatively, the interference information may include at least a part of the information shown in Table 1. The embodiment of the disclosure is not limited thereto.

At S220, the first TRP may receive the interference information of the first cell transmitted by the second TRP, and transmits the interference information of the first cell to the first terminal device.

Alternatively, the first cell may also receive interference information of a second cell transmitted by a third TRP. The second cell belongs to the third TRP, and the second cell may be a potential interference cell of the first terminal device. At this time, the first TRP may transmit, to the first terminal device, interference information of each potential interference cell in at least one potential interference cell of the first terminal device. The at least one potential interference cell includes the first cell and the second cell.

In S220, the first TRP may transmit, to the first terminal device, interference information of each potential interference cell in the at least one potential interference cell through an air interface between the first TRP and the first terminal device. As an alternative embodiment, the interference information transmitted on the air interface may have the format shown in Table 2.

TABLE 2

Example of interference information format transmitted on air interface
Interference information of a potential interference cell > Cell identifier #1
  >> Transmission scheme and physical layer parameter of resource pool #1
    >>> Time-frequency resource information of resource pool #1
    >>> Transmission scheme of resource pool #1
      >>>> Duplex mode
      >>>> Multiple access scheme
    >>> Physical layer parameter of resource pool #1
      >>>> Subcarrier spacing of an OFDMA scheme (if a multiple access scheme is OFDMA)
      >>>> Chip rate of an ODMA scheme (if a multiple access scheme is ODMA)
      >>>> Filter configuration of a Filtered-OFDMA scheme (if a multiple access scheme is Filtered-OFDMA)
      >>>> Configuration of a non-orthogonal multiple access scheme (if a multiple access scheme is non-orthogonal multiple access)
      >>>> Frame structure
        >>>>> Subframe/slot length
        >>>>> CRS configuration
        >>>>> Common control channel configuration
      >>>> Subframe structure
        >>>>> Intra-subframe uplink and downlink configuration
        >>>>> Intra-subframe common control channel configuration
    >>> UE-specific resource allocation of resource pool #1
      >>>> UE #1
        >>>>> UE-specific reference signal configuration
        >>>>> UE-specific control channel configuration
        >>>>> Resource allocation of transmission block #1
        >>>>> Resource allocation of transmission block #2
        >>>>> ......
      >>>> UE #2
      >>>> ......
  >> Transmission scheme and physical layer parameter of resource pool #2
    >> .......
> Cell identifier #2
  > ......

It should be understood that Table 2 exemplarily shows the format of the interference information. Alternatively, the interference information may include at least a part of the information shown in Table 2. The embodiment of the disclosure is not limited thereto.

At S230, the first terminal device receives the interference information of each potential interference cell in at least one potential interference cell transmitted by the first TRP, and performs interference cancellation on a signal received from the first TRP according to the interference information of each potential interference cell in the at least one potential interference cell.

In the embodiment of the disclosure, alternatively, the second TRP may actively transmit the interference information of the first cell to the first TRP; or, before S210, the first TRP may transmit an invoke indication to the second TRP, and the invoke indication may be used to invoke the second TRP to transmit the interference information of the first cell. In this case, in S210, the second TRP may specifically transmit the interference information of the first cell to the first TRP according to the received invoke indication. Alternatively, the invoke indication may also carry information about at least one target transmission resource pool of the first cell to invoke the second TRP to transmit the interference information of the first cell over the at least one target transmission resource pool to the first TRP. Correspondingly, the interference information of the first cell transmitted by the second TRP may be specifically the interference information of the first cell in each of the at least one target transmission resource pool, but the embodiment of the disclosure is not limited to this. A specific implementation of the invoke indication transmitted by the first TRP to the second TRP may refer to the related description above, and for convenience of brevity, no further details are provided herein.

As an alternative embodiment, the interference information of the first cell in the target transmission resource pool may include at least one of the following: information of a duplex mode adopted by the first cell in the target transmission resource pool, information of a multiple access scheme adopted by the first cell in the target transmission resource pool, a physical layer parameter of the first cell in the target transmission resource pool, and the resource allocation information of the first cell in the target transmission resource pool. In this case, the at least one first transmission resource pool, the at least one second transmission resource pool, the at least one third transmission resource pool and the at least one fourth transmission resource pool may be specifically the at least one target transmission resource pool, but the embodiment of the disclosure is not limited thereto.

In this way, a transmitting end invokes a receiving end to feed back interference information (such as a transmission scheme and/or a physical layer parameter) of the receiving end within a target transmission resource range in an invoke indication, such that the receiving end may transmit only the interference information of the receiving end within the target transmission resource range to the transmitting end without feeding back the interference information of the receiving end over all transmission resource ranges, thereby reducing signaling overhead. In addition, the receiving end may perform resource scheduling according to the target transmission resource range indicated in the invoke indication, and align the resource allocation of the receiving end with the resource allocation of the transmitting end as far as possible, thereby reducing the complexity of an inter-cell interference cancellation algorithm.

Therefore, according to the method for canceling inter-cell interference in the embodiment of the disclosure, a second TRP transmits interference information of a potential interference cell to a first TRP, the first TRP transmits, to a first terminal device, the received interference information of each of at least one potential interference cell, and the first terminal device performs interference cancellation according to the received interference information of the at least one potential interference cell, which is capable of achieving inter-cell interference cancellation and improve system performance.

In addition, the interference information may include at least one of the following information: duplex mode information, multiple access scheme information, a physical layer parameter in each of at least one first transmission resource pool, and resource allocation information in each of at least one second transmission resource pool, and can be applied to interference cancellation between two cells using different transmission schemes and physical layer parameters.

It should be understood that the size of the sequence numbers of the above processes does not imply a sequence of executions, and the order of execution of the processes should be determined by its function and internal logic, and should not be construed as limiting the implementation process of the embodiment of the disclosure.

A method for canceling inter-cell interference according to an embodiment of the disclosure is described in detail above with reference to FIG. 2. An apparatus and system for canceling inter-cell interference according to an embodiment of the disclosure will be described in detail below with reference to FIG. 3 to FIG. 9.

Figure 3:
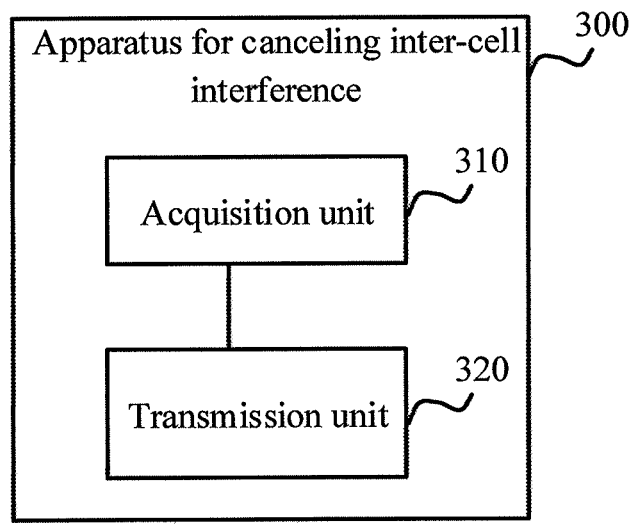
FIG. 3 is a schematic block diagram of an apparatus for canceling inter-cell interference according to an embodiment of the disclosure.

FIG. 3 is a schematic block diagram of an apparatus 300 for canceling inter-cell interference according to an embodiment of the disclosure. The apparatus 300 for canceling inter-cell interference includes an acquisition unit 310 and a transmission unit 320.

The acquisition unit 310 is configured to acquire interference information of a potential interference cell. The potential interference cell belongs to a second TRP, and the interference information of the potential interference cell includes at least one of the following: duplex mode information of the potential interference cell, multiple access scheme information of the potential interference cell, a physical layer parameter of the potential interference cell in each of at least one first transmission resource pool, and resource allocation information of the potential interference cell in each of at least one second transmission resource pool.

The transmission unit 320 is configured to transmit the interference information of the potential interference cell acquired by the acquisition unit 310 to a first terminal device.

Alternatively, the duplex mode information of the potential interference cell includes: information about a duplex mode adopted by the potential interference cell in each of at least one third transmission resource pool.

Alternatively, the multiple access scheme information of the potential interference cell includes: information about a multiple access scheme adopted by the potential interference cell in each of at least one fourth transmission resource pool.

Alternatively, the physical layer parameter includes at least one of the following: a multiple access scheme basic transmission parameter, a frame structure parameter, and a subframe structure parameter.

Alternatively, the frame structure parameter includes at least one of the following: a subframe length, a slot length, an intra-frame uplink and downlink resource configuration, an intra-frame CRS configuration, an intra-frame common channel configuration, and an intra-frame control channel configuration.

Alternatively, the subframe structure parameter includes at least one of the following: an intra-subframe uplink and downlink resource configuration, an intra-subframe common channel configuration, and an intra-subframe control channel configuration.

Alternatively, the resource allocation information of the potential reference cell in the second transmission resource pool includes at least one of the following: configuration information of a UE-specific reference signal of each of at least one second terminal device served by the potential reference cell in the second transmission resource pool, configuration information of a UE-specific control channel of each second terminal device in the second transmission resource pool, and information about a transmission resource allocated to each second terminal device by the potential reference cell in the second transmission resource pool.

Alternatively, the acquisition unit 310 includes: a receiving subunit, configured to receive interference information of the potential interference cell transmitted by a second TRP to which the potential interference cell belongs.

Alternatively, the transmission unit 320 is further configured to: transmit, before the receiving subunit receives interference information of the potential interference cell transmitted by a second TRP to which the potential interference cell belongs, an invoke indication to the second TRP, the invoke indication being used for invoking the second TRP to transmit interference information of the potential interference cell in at least one target transmission resource pool.

Correspondingly, the receiving subunit is specifically configured to receive interference information of the potential interference cell in each of the at least one target transmission resource pool, which is transmitted by the second TRP according to the invoke indication transmitted by the transmission unit 320. The interference information of the potential interference cell in the target transmission resource pool includes at least one of the following: duplex mode information of the potential interference cell in the target transmission resource pool, multiple access scheme information of the potential interference cell in the target transmission resource pool, a physical layer parameter of the potential interference cell in the target transmission resource pool, and resource allocation information of the potential interference cell in the target transmission resource pool.

It should be understood that the apparatus 300 herein is embodied in the form of a functional unit. In an alternative example, those skilled in the art may understand that the apparatus 300 may be specifically the first TRP in the foregoing embodiment, and may be configured to perform various flows and/or steps corresponding to the first TRP in the foregoing method embodiment. To avoid repetition, no descriptions will be made herein.

Figure 4:
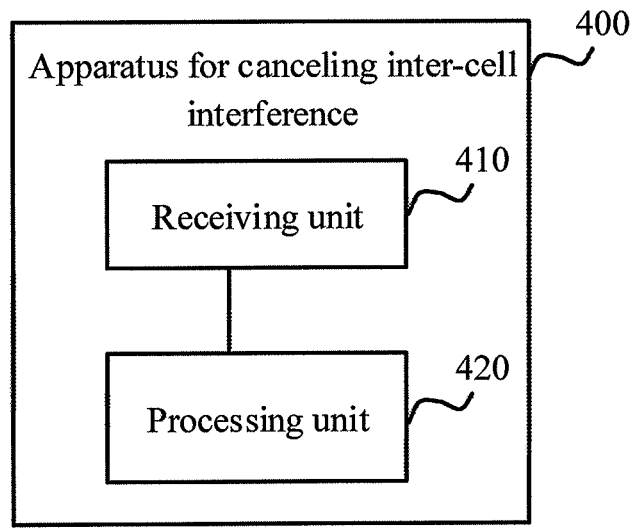
FIG. 4 is a schematic block diagram of an apparatus for canceling inter-cell interference according to another embodiment of the disclosure.

FIG. 4 is a schematic block diagram of an apparatus 400 for canceling inter-cell interference according to another embodiment of the disclosure. The apparatus 400 for canceling inter-cell interference includes a receiving unit 410 and a processing unit 420.

The receiving unit 410 is configured to receive interference information of a potential interference cell transmitted by a first TRP, the interference information of the potential interference cell including at least one of the following: duplex mode information of the potential interference cell, multiple access scheme information of the potential interference cell, a physical layer parameter of the potential interference cell in each of at least one first transmission resource pool, and resource allocation information of the potential interference cell in each of at least one second transmission resource pool.

The processing unit 420 is configured to perform interference cancellation on a signal received from the first TRP according to the interference information of the potential interference cell received by the receiving unit 410.

Alternatively, the duplex mode information of the potential interference cell includes: information about a duplex mode adopted by the potential interference cell in each of at least one third transmission resource pool.

Alternatively, the multiple access scheme information of the potential interference cell includes: information about a multiple access scheme adopted by the potential interference cell in each of at least one fourth transmission resource pool.

Alternatively, the physical layer parameter includes at least one of the following parameters: a multiple access scheme basic transmission parameter, a frame structure parameter, and a subframe structure parameter.

Alternatively, the frame structure parameter includes at least one of the following: a subframe length, a slot length, an intra-frame uplink and downlink resource configuration, an intra-frame CRS configuration, an intra-frame common channel configuration, and an intra-frame control channel configuration.

Alternatively, the subframe structure parameter includes at least one of the following: an intra-subframe uplink and downlink resource configuration, an intra-subframe common channel configuration, and an intra-subframe control channel configuration.

Alternatively, the resource allocation information of the potential reference cell in the second transmission resource pool includes at least one of the following: configuration information of a UE-specific reference signal of each of at least one second terminal device served by the potential reference cell in the second transmission resource pool, configuration information of a UE-specific control channel of each second terminal device in the second transmission resource pool, and information about a transmission resource allocated to each second terminal device by the potential reference cell in the second transmission resource pool.

It should be understood that the apparatus 400 herein is embodied in the form of a functional unit. In an alternative example, those skilled in the art may understand that the apparatus 400 may be specifically the first terminal device in the foregoing embodiment, and may be configured to perform various flows and/or steps corresponding to the first terminal device in the foregoing method embodiment. To avoid repetition, no descriptions will be made herein.

Figure 5:
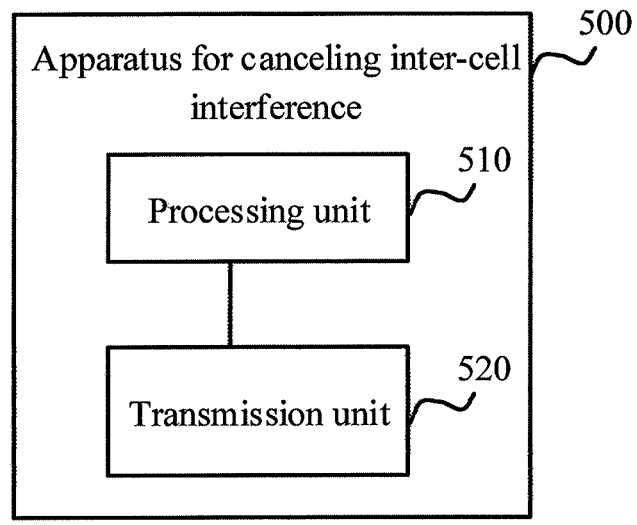
FIG. 5 is a schematic block diagram of an apparatus for canceling inter-cell interference according to another embodiment of the disclosure.

FIG. 5 is an apparatus 500 for canceling inter-cell interference according to another embodiment of the disclosure. The apparatus 500 for canceling inter-cell interference includes a processing unit 510 and a transmission unit 520.

The processing unit 510 is configured to determine interference information of a first cell. The first cell belongs to the apparatus, and the interference information of the first cell includes at least one of the following: duplex mode information of the first cell, multiple access scheme information of the first cell, a physical layer parameter of the first cell in each of at least one first transmission resource pool, and resource allocation information of the first cell in each of at least one second transmission resource pool.

The transmission unit 520 is configured to transmit the interference information of the first cell determined by the processing unit 510 to a first TRP.

Alternatively, the duplex mode information of the first cell includes: information about a duplex mode adopted by the first cell in each of at least one third transmission resource pool.

Alternatively, the multiple access scheme information of the first cell includes: information about a multiple access scheme adopted by the first cell in each of at least one fourth transmission resource pool.

Alternatively, the physical layer parameter includes at least one of the following parameters: a multiple access scheme basic transmission parameter, a frame structure parameter, and a subframe structure parameter.

Alternatively, the frame structure parameter includes at least one of the following: a subframe length, a slot length, an intra-frame uplink and downlink resource configuration, an intra-frame CRS configuration, an intra-frame common channel configuration, and an intra-frame control channel configuration.

Alternatively, the subframe structure parameter includes at least one of the following: an intra-subframe uplink and downlink resource configuration, an intra-subframe common channel configuration, and an intra-subframe control channel configuration.

Alternatively, the resource allocation information of the first cell in the second transmission resource pool includes at least one of the following: configuration information of a User Equipment (UE)-specific reference signal of each of at least one second terminal device served by the first cell in the second transmission resource pool, configuration information of a UE-specific control channel of each second terminal device in the second transmission resource pool, and information about a transmission resource allocated to each second terminal device by the first cell in the second transmission resource pool.

Alternatively, the apparatus 500 further includes: a receiving unit, configured to enable, before the transmission unit 520 transmits the interference information of the first cell to a first TRP, a second TRP to receive an invoke indication transmitted by the first TRP, the invoke indication being used for invoking the second TRP to transmit interference information of the first cell in at least one target transmission resource pool.

Correspondingly, the transmission unit 520 is specifically configured to transmit interference information of the first cell in each of the at least one target transmission resource pool to the first TRP according to the invoke indication received by the receiving unit. The interference information of the potential interference cell in the target transmission resource pool includes at least one of the following: duplex mode information of the potential interference cell in the target transmission resource pool, multiple access scheme information of the potential interference cell in the target transmission resource pool, a physical layer parameter of the potential interference cell in the target transmission resource pool, and resource allocation information of the potential interference cell in the target transmission resource pool.

It should be understood that the apparatus 500 herein is embodied in the form of a functional unit. In an alternative example, those skilled in the art may understand that the apparatus 500 may be specifically the second TRP in the foregoing embodiment, and may be configured to perform various flows and/or steps corresponding to the terminal device in the foregoing method embodiment. To avoid repetition, no descriptions will be made herein.

It should be understood that the term "unit" herein may refer to an Application Specific Integrated Circuit (ASIC), an electronic circuit, a processor for executing one or more software or firmware programs (such as a shared processor, a dedicated processor or group processor) and a memory, a merge logic circuit, and/or other suitable components that support the functions described.

Figure 6:
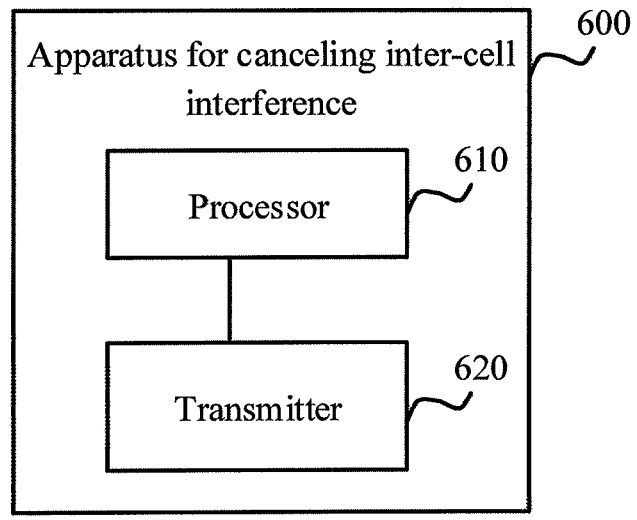
FIG. 6 is a schematic block diagram of an apparatus for canceling inter-cell interference according to another embodiment of the disclosure.

FIG. 6 is a schematic block diagram of an apparatus 600 for canceling inter-cell interference according to an embodiment of the disclosure. The apparatus 600 for canceling inter-cell interference includes: a processor 1110 and a transmitter 1120 coupled to the processor 1110.

The processor 610 is configured to acquire interference information of a potential interference cell. The potential interference cell belongs to a second TRP, and the interference information of the potential interference cell includes at least one of the following: duplex mode information of the potential interference cell, multiple access scheme information of the potential interference cell, a physical layer parameter of the potential interference cell in each of at least one first transmission resource pool, and resource allocation information of the potential interference cell in each of at least one second transmission resource pool.

The transmitter 620 is configured to transmit the interference information of the potential interference cell acquired by the processor 610 to a first terminal device.

Alternatively, the duplex mode information of the potential interference cell includes: information about a duplex mode adopted by the potential interference cell in each of at least one third transmission resource pool.

Alternatively, the multiple access scheme information of the potential interference cell includes: information about a multiple access scheme adopted by the potential interference cell in each of at least one fourth transmission resource pool.

Alternatively, the physical layer parameter includes at least one of the following: a multiple access scheme basic transmission parameter, a frame structure parameter, and a subframe structure parameter.

Alternatively, the frame structure parameter includes at least one of the following: a subframe length, a slot length, an intra-frame uplink and downlink resource configuration, an intra-frame CRS configuration, an intra-frame common channel configuration, and an intra-frame control channel configuration.

Alternatively, the subframe structure parameter includes at least one of the following: an intra-subframe uplink and downlink resource configuration, an intra-subframe common channel configuration, and an intra-subframe control channel configuration.

Alternatively, the resource allocation information of the potential reference cell in the second transmission resource pool includes at least one of the following: configuration information of a UE-specific reference signal of each of at least one second terminal device served by the potential reference cell in the second transmission resource pool, configuration information of a UE-specific control channel of each second terminal device in the second transmission resource pool, and information about a transmission resource allocated to each second terminal device by the potential reference cell in the second transmission resource pool.

Alternatively, the apparatus may further include: a receiver, configured to receive interference information of the potential interference cell transmitted by a second TRP to which the potential interference cell belongs.

Alternatively, the transmitter 620 is further configured to: transmit, before the receiver receives interference information of the potential interference cell transmitted by a second TRP to which the potential interference cell belongs, an invoke indication to the second TRP, the invoke indication being used for invoking the second TRP to transmit interference information of the potential interference cell in at least one target transmission resource pool.

Correspondingly, the receiver is specifically configured to receive interference information of the potential interference cell in each of the at least one target transmission resource pool, which is transmitted by the second TRP according to the invoke indication transmitted by the transmitter 620. The interference information of the potential interference cell in the target transmission resource pool includes at least one of the following: duplex mode information of the potential interference cell in the target transmission resource pool, multiple access scheme information of the potential interference cell in the target transmission resource pool, a physical layer parameter of the potential interference cell in the target transmission resource pool, and resource allocation information of the potential interference cell in the target transmission resource pool.

Alternatively, the apparatus 600 may further include a memory, which may include a read only memory and a random access memory and provides instructions and data to the processor. A portion of the memory may also include a non-volatile random access memory. For example, the memory may also store information of a device type. The processor may be used to execute instructions stored in the memory, and when the processor executes the instructions, the processor may perform the steps corresponding to the terminal device in the above method embodiments.

It should be understood that the apparatus 600 may be specifically the first TRP in the foregoing embodiment, and may be configured to perform various flows and/or steps corresponding to the first TRP in the foregoing method embodiment. For brevity, no descriptions will be made herein.

Figure 7:
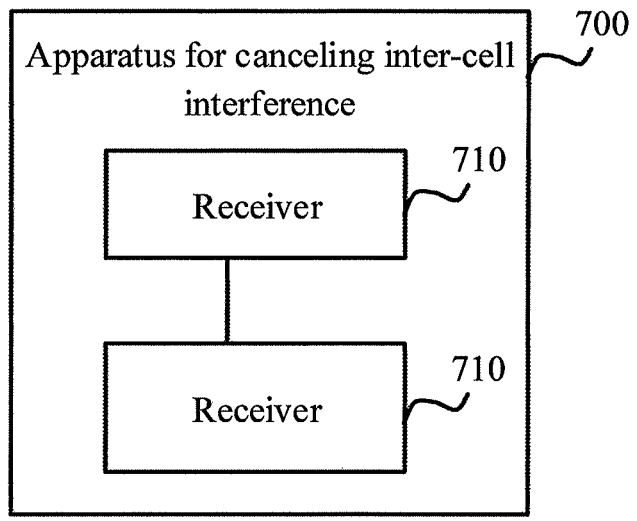
FIG. 7 is a schematic block diagram of an apparatus for canceling inter-cell interference according to another embodiment of the disclosure.

FIG. 7 is a schematic block diagram of an apparatus 700 for canceling inter-cell interference according to another embodiment of the disclosure. The apparatus 700 for canceling inter-cell interference includes a receiver 710 and a processor 720. The receiver 710 is configured to receive interference information of a potential interference cell transmitted by a first TRP, the interference information of the potential interference cell including at least one of the following: duplex mode information of the potential interference cell, multiple access scheme information of the potential interference cell, a physical layer parameter of the potential interference cell in each of at least one first transmission resource pool, and resource allocation information of the potential interference cell in each of at least one second transmission resource pool.

The processor 720 is configured to perform interference cancellation on a signal received from the first TRP according to the interference information of the potential interference cell received by the receiver 710.

Alternatively, the duplex mode information of the potential interference cell includes: information about a duplex mode adopted by the potential interference cell in each of at least one third transmission resource pool.

Alternatively, the multiple access scheme information of the potential interference cell includes: information about a multiple access scheme adopted by the potential interference cell in each of at least one fourth transmission resource pool.

Alternatively, the physical layer parameter includes at least one of the following parameters: a multiple access scheme basic transmission parameter, a frame structure parameter, and a subframe structure parameter.

Alternatively, the frame structure parameter includes at least one of the following: a subframe length, a slot length, an intra-frame uplink and downlink resource configuration, an intra-frame CRS configuration, an intra-frame common channel configuration, and an intra-frame control channel configuration.

Alternatively, the subframe structure parameter includes at least one of the following: an intra-subframe uplink and downlink resource configuration, an intra-subframe common channel configuration, and an intra-subframe control channel configuration.

Alternatively, the resource allocation information of the potential reference cell in the second transmission resource pool includes at least one of the following: configuration information of a UE-specific reference signal of each of at least one second terminal device served by the potential reference cell in the second transmission resource pool, configuration information of a UE-specific control channel of each second terminal device in the second transmission resource pool, and information about a transmission resource allocated to each second terminal device by the potential reference cell in the second transmission resource pool.

Alternatively, the apparatus 700 may further include a memory, which may include a read only memory and a random access memory and provides instructions and data to the processor. A portion of the memory may also include a non-volatile random access memory. For example, the memory may also store information of a device type. The processor may be used to execute instructions stored in the memory, and when the processor executes the instructions, the processor may perform the steps corresponding to the terminal device in the above method embodiments.

It should be understood that the apparatus 700 may be specifically the first terminal device in the foregoing embodiment, and may be configured to perform various flows and/or steps corresponding to the first terminal device in the foregoing method embodiment. For brevity, no descriptions will be made herein.

Figure 8:
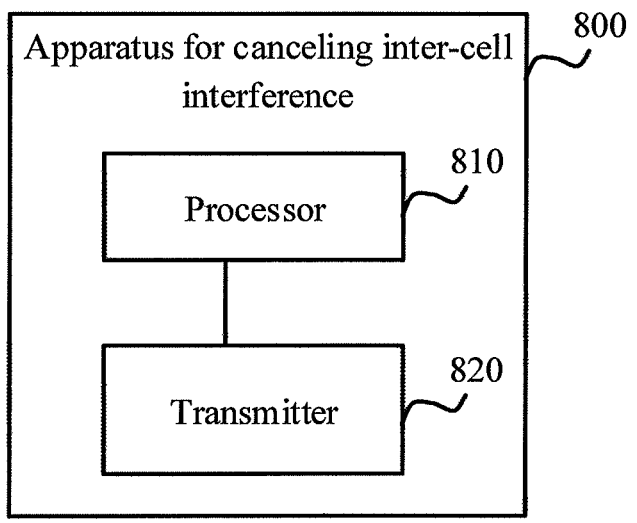
FIG. 8 is a schematic block diagram of an apparatus for canceling inter-cell interference according to another embodiment of the disclosure.

FIG. 8 is an apparatus 800 for canceling inter-cell interference according to another embodiment of the disclosure. The apparatus 800 for canceling inter-cell interference includes a processor 810 and a transmitter 820.

The processor 810 is configured to determine interference information of a first cell. The first cell belongs to the apparatus, and the interference information of the first cell includes at least one of the following: duplex mode information of the first cell, multiple access scheme information of the first cell, a physical layer parameter of the first cell in each of at least one first transmission resource pool, and resource allocation information of the first cell in each of at least one second transmission resource pool.

The transmitter 820 is configured to transmit the interference information of the first cell determined by the processor 810 to a first TRP.

Alternatively, the duplex mode information of the first cell includes: information about a duplex mode adopted by the first cell in each of at least one third transmission resource pool.

Alternatively, the multiple access scheme information of the first cell includes: information about a multiple access scheme adopted by the first cell in each of at least one fourth transmission resource pool.

Alternatively, the physical layer parameter includes at least one of the following parameters: a multiple access scheme basic transmission parameter, a frame structure parameter, and a subframe structure parameter.

Alternatively, the frame structure parameter includes at least one of the following: a subframe length, a slot length, an intra-frame uplink and downlink resource configuration, an intra-frame CRS configuration, an intra-frame common channel configuration, and an intra-frame control channel configuration.

Alternatively, the subframe structure parameter includes at least one of the following: an intra-subframe uplink and downlink resource configuration, an intra-subframe common channel configuration, and an intra-subframe control channel configuration.

Alternatively, the resource allocation information of the first cell in the second transmission resource pool includes at least one of the following: configuration information of a User Equipment (UE)-specific reference signal of each of at least one second terminal device served by the first cell in the second transmission resource pool, configuration information of a UE-specific control channel of each second terminal device in the second transmission resource pool, and information about a transmission resource allocated to each second terminal device by the first cell in the second transmission resource pool.

Alternatively, the apparatus 800 further includes: a receiver, configured to enable, before the transmitter 820 transmits the interference information of the first cell to a first TRP, a second TRP to receive an invoke indication transmitted by the first TRP, the invoke indication being used for invoking the second TRP to transmit interference information of the first cell in at least one target transmission resource pool.

Correspondingly, the transmitter 820 is specifically configured to transmit interference information of the first cell in each of the at least one target transmission resource pool to the first TRP according to the invoke indication received by the receiver. The interference information of the potential interference cell in the target transmission resource pool includes at least one of the following: duplex mode information of the potential interference cell in the target transmission resource pool, multiple access scheme information of the potential interference cell in the target transmission resource pool, a physical layer parameter of the potential interference cell in the target transmission resource pool, and resource allocation information of the potential interference cell in the target transmission resource pool.

Alternatively, the apparatus 800 may further include a memory, which may include a read only memory and a random access memory and provides instructions and data to the processor. A portion of the memory may also include a non-volatile random access memory. For example, the memory may also store information of a device type. The processor may be used to execute instructions stored in the memory, and when the processor executes the instructions, the processor may perform the steps corresponding to the terminal device in the above method embodiments.

It should be understood that the apparatus 800 may be specifically the second TRP in the foregoing embodiment, and may be configured to perform various flows and/or steps corresponding to the second TRP in the foregoing method embodiment. For brevity, no descriptions will be made herein.

It should also be understood that in the embodiment of the disclosure, the processor may be a Central Processing Unit (CPU), and the processor may also be other general-purpose processors, Digital Signal Processors (DSPs), ASICs, Field Programmable Gate Arrays (FPGAs) or other programmable logic devices, discrete gate or transistor logic devices, discrete hardware components, or the like. The general-purpose processor may be a microprocessor, or the processor may be any conventional processor.

In the implementation process, each step of the above method may be completed by an integrated logic circuit of hardware in the processor or an instruction in the form of software. The steps of the method disclosed in the embodiment of the disclosure may be directly implemented as a hardware processor, or may be performed by a combination of hardware and software modules in the processor. The software module may be located in a mature storage medium such as a random access memory, a flash memory, a read only memory, a programmable read only memory or an electrically erasable programmable memory, and a register. The storage medium is located in a memory, and the processor executes instructions in the memory and performs the steps of the above method in combination with hardware. To avoid repetition, no descriptions will be made herein.

Figure 9:
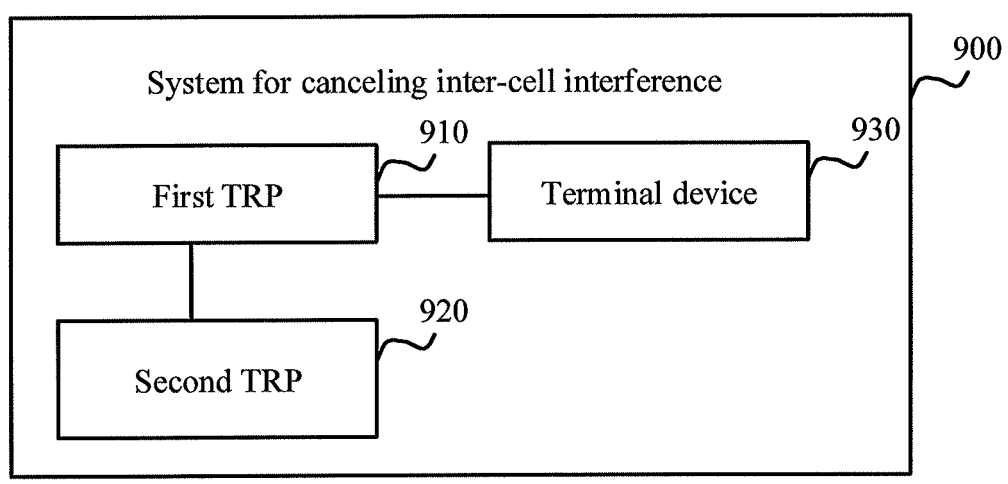
FIG. 9 is a schematic block diagram of a system for canceling inter-cell interference according to an embodiment of the disclosure.

FIG. 9 shows a system 900 for canceling inter-cell interference according to an embodiment of the disclosure. The system architecture of the system 900 may refer to the foregoing wireless communication system 100, but the embodiment of the disclosure is not limited thereto.

Specifically, the system 900 may include: a first TRP 910, a second TRP 920, and a terminal device 930. The first TRP 910 may currently provide services for the terminal device 930, and a first cell of the second TRP 920 may be a potential interference cell of the terminal device 930, that is, data transmission between the first cell and the terminal device served by the first cell currently interferes with or may interfere with data transmission between the first TRP 910 and the terminal device 930.

The second TRP 920 may be configured to transmit the interference information of the first cell to the first TRP 910. The first TRP 910 may be configured to receive the interference information of the first cell transmitted by the second TRP, and transmit the interference information of the first cell to the terminal device 930. The terminal device 930 may be configured to receive the interference information of the first cell transmitted by the first TRP 910, and perform interference cancellation on the received signal according to the interference information of the first cell.

As an alternative embodiment, the first TRP 910 may be specifically the above apparatus 300, the second TRP may be specifically the above apparatus 500, and the terminal device 930 may be specifically the above apparatus 400.

As another alternative embodiment, the first TRP 910 may be specifically the above apparatus 600, the second TRP may be specifically the above apparatus 800, and the terminal device 930 may be specifically the above apparatus 700.

It should be understood that the description of the embodiments herein emphasizes the differences between the various embodiments, and the same or similarities that are not mentioned may be referred to each other.

Those skilled in the art will appreciate that the various method steps and units described in the embodiments disclosed herein can be implemented in electronic hardware, computer software, or a combination of both. In order to clearly illustrate the interchangeability of hardware and software, the steps and composition of the various embodiments have been generally described in terms of function in the foregoing description. Whether these functions are performed in hardware or software depends on the specific application and design constraints of the technical solution. Those of ordinary skill in the art can use different methods for implementing the described functions for each particular application, but such implementation should not be considered to be beyond the scope of the disclosure.

Those skilled in the art can clearly understand that for the convenience and brevity of the description, the specific working process of the system, the apparatus and the unit described above can refer to the corresponding process in the foregoing method embodiment, and details are not described herein again.

In the several embodiments provided by the present application, it should be understood that the disclosed systems, apparatuses, and methods may be implemented in other manners. For example, the apparatus embodiments described above are merely illustrative. For example, the division of the unit is only a logical function division. In actual implementation, there may be another division manner, for example, multiple units or components may be combined or integrated into another system, or some features may be ignored or not executed. In addition, the coupling or direct coupling or communication connection shown or discussed may be an indirect coupling or communication connection through some interfaces, apparatuses or units, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment of the disclosure.

In addition, each functional unit in each embodiment of the disclosure may be integrated into one processing unit, or each unit may exist physically separately, or two or more units may be integrated into one unit. The integrated unit may be implemented in the form of hardware or implemented in the form of a software function unit.

The integrated unit may be stored in a computer-readable storage medium if being implemented in the form of a software functional unit and sold or used as a standalone product. Based on such understanding, the technical solution of the disclosure, which is essential to the conventional art or all or part of the technical solution, may be embodied in the form of a software product stored in a storage medium, including a plurality of instructions used to cause a computer device (which may be a personal computer, server, or network device, etc.) to perform all or part of the steps of the methods described in various embodiments of the disclosure. The foregoing storage medium includes: a U disk, a mobile hard disk, a Read-Only Memory (ROM), a Random Access Memory (RAM), a magnetic disk, or an optical disk, or the like, which may store a program code.

The foregoing is only a specific implementation manner of the disclosure, but the scope of protection of the disclosure is not limited thereto. Any person skilled in the art can easily think of various equivalent modifications or replacements within the technical scope disclosed in the disclosure, which should be covered by the scope of protection of the disclosure. Therefore, the scope of protection of the disclosure should be determined by the scope of the claims.

The invention claimed is:

1. A method for canceling inter-cell interference, comprising:
   acquiring, by a first Transmission and Reception Point (TRP), interference information of a potential interference cell, wherein the potential interference cell belongs to a second TRP and the potential interference cell is a cell currently interfering with a first terminal device, or is a cell that may interfere with the first terminal device, and the interference information of the potential interference cell comprises multiple access scheme information of the potential interference cell, and the multiple access scheme information of the potential interference cell comprises: information about a multiple access scheme adopted by the potential interference cell in each of at least one fourth transmission resource pool, and the at least one fourth transmission resource pool is part or all of transmission resource pools of the potential interference cell; and
   transmitting, by the first TRP, the interference information of the potential interference cell to the first terminal device.

2. The method according to claim 1, wherein the interference information of the potential interference cell further comprises at least one of: duplex mode information of the potential interference cell, a physical layer parameter of the potential interference cell in each of at least one first transmission resource pool, and resource allocation information of the potential interference cell in each of at least one second transmission resource pool.

3. The method according to claim 2, wherein the duplex mode information of the potential interference cell comprises: information about a duplex mode adopted by the potential interference cell in each of at least one third transmission resource pool.

4. The method according to claim 2, wherein the physical layer parameter comprises at least one of: a multiple access scheme basic transmission parameter, a frame structure parameter, and a subframe structure parameter.

5. The method according to claim 4, wherein the frame structure parameter comprises at least one of: a subframe length, a slot length, an intra-frame uplink and downlink resource configuration, an intra-frame Common Reference Signal (CRS) configuration, an intra-frame common channel configuration, and an intra-frame control channel configuration; and/or,
   the subframe structure parameter comprises at least one of: an intra-subframe uplink and downlink resource configuration, an intra-subframe common channel configuration, and an intra-subframe control channel configuration.

6. The method according to claim 2, wherein the resource allocation information of the potential interference cell in each of the second transmission resource pool comprises at least one of: configuration information of a User Equipment (UE)-specific reference signal of each of at least one second terminal device served by the potential reference cell in each of the second transmission resource pool, configuration information of a UE-specific control channel of each of the at least one second terminal device in each of the second transmission resource pool, and information about a transmission resource allocated to each of the at least one second terminal device by the potential reference cell in each of the second transmission resource pool.

7. The method according to claim 1, wherein acquiring, by the first TRP, the interference information of the potential interference cell comprises:
   receiving, by the first TRP, interference information of the potential interference cell transmitted by a second TRP to which the potential interference cell belongs.

8. The method according to claim 7, before receiving, by the first TRP, interference information of the potential interference cell transmitted by the second TRP to which the potential interference cell belongs, the method further comprising:

transmitting, by the first TRP, an invoke indication to the second TRP, the invoke indication being used for invoking the second TRP to transmit interference information of the potential interference cell in at least one target transmission resource pool; and wherein receiving, by the first TRP, interference information of the potential interference cell transmitted by a second TRP to which the potential interference cell belongs comprises:

receiving, by the first TRP, interference information of the potential interference cell in each of the at least one target transmission resource pool, the interference information being transmitted by the second TRP according to the invoke indication, wherein the interference information of the potential interference cell in the target transmission resource pool comprises at least one of: duplex mode information of the potential interference cell in the target transmission resource pool, multiple access scheme information of the potential interference cell in the target transmission resource pool, a physical layer parameter of the potential interference cell in the target transmission resource pool, and resource allocation information of the potential interference cell in the target transmission resource pool.

9. A method for canceling inter-cell interference, comprising:

receiving, by a first terminal device, interference information of a potential interference cell transmitted by a first Transmission and Reception Point (TRP), the interference information of the potential interference cell comprising multiple access scheme information of the potential interference cell, and the multiple access scheme information of the potential interference cell comprises: information about a multiple access scheme adopted by the potential interference cell in each of at least one fourth transmission resource pool, and the at least one fourth transmission resource pool is part or all of transmission resource pools of the potential interference cell, wherein the potential interference cell is a cell currently interfering with the first terminal device, or is a cell that may interfere with the first terminal device; and performing, by the first terminal device, interference cancellation on a signal received from the first TRP according to the interference information of the potential interference cell.

10. The method according to claim 9, wherein the interference information of the potential interference cell further comprises at least one of: duplex mode information of the potential interference cell, a physical layer parameter of the potential interference cell in each of at least one first transmission resource pool, and resource allocation information of the potential interference cell in each of at least one second transmission resource pool.

11. The method according to claim 10, wherein the duplex mode information of the potential interference cell comprises: information about a duplex mode adopted by the potential interference cell in each of at least one third transmission resource pool.

12. The method according to claim 10, wherein the physical layer parameter comprises at least one of: a multiple access scheme basic transmission parameter, a frame structure parameter, and a subframe structure parameter.

13. The method according to claim 12, wherein the frame structure parameter comprises at least one of: a subframe length, a slot length, an intra-frame uplink and downlink resource configuration, an intra-frame Common Reference Signal (CRS) configuration, an intra-frame common channel configuration, and an intra-frame control channel configuration; and/or, the subframe structure parameter comprises at least one of: an intra-subframe uplink and downlink resource configuration, an intra-subframe common channel configuration, and an intra-subframe control channel configuration.

14. The method according to claim 10, wherein the resource allocation information of the potential reference cell in each of the second transmission resource pool comprises at least one of: configuration information of a User Equipment (UE)-specific reference signal of each of at least one second terminal device served by the potential reference cell in each of the second transmission resource pool, configuration information of a UE-specific control channel of each of the at least one second terminal device in each of the second transmission resource pool, and information about a transmission resource allocated to each of the at least one second terminal device by the potential reference cell in each of the second transmission resource pool.

15. A method for canceling inter-cell interference, comprising:

determining, by a second Transmission and Reception Point (TRP), interference information of a first cell, wherein the first cell belongs to the second TRP and the first cell is a cell currently interfering with a first terminal device, or is a cell that may interfere with the first terminal device, and the interference information of the first cell comprises multiple access scheme information of the first cell, and the multiple access scheme information of the first cell comprises: information about a multiple access scheme adopted by the first cell in each of at least one fourth transmission resource pool, and the at least one fourth transmission resource pool is part or all of transmission resource pools of the first cell; and transmitting, by the second TRP, the interference information of the first cell to a first TRP.

16. The method according to claim 15, wherein the interference information of the first cell further comprises at least one of: duplex mode information of the first cell, a physical layer parameter of the first cell in each of at least one first transmission resource pool, and resource allocation information of the first cell in each of at least one second transmission resource pool.

17. The method according to claim 16, wherein the physical layer parameter comprises at least one of: a multiple access scheme basic transmission parameter, a frame structure parameter, and a subframe structure parameter.

18. The method according to claim 17, wherein the frame structure parameter comprises at least one of: a subframe length, a slot length, an intra-frame uplink and downlink resource configuration, an intra-frame Common Reference Signal (CRS) configuration, an intra-frame common channel configuration, and an intra-frame control channel configuration; and/or, the subframe structure parameter comprises at least one of: an intra-subframe uplink and downlink resource configuration, an intra-subframe common channel configuration, and an intra-subframe control channel configuration.

19. The method according to claim 16, wherein the resource allocation information of the first cell in each second transmission resource pool comprises at least one of: configuration information of a User Equipment (UE)-specific reference signal of each of at least one second terminal device served by the first cell in each second transmission resource pool, configuration information of a UE-specific control channel of each second terminal device in each second transmission resource pool, and information about a transmission resource allocated to each second terminal device by the first cell in each second transmission resource pool.

20. The method according to claim 15, before transmitting, by the second TRP, the interference information of the first cell to a first TRP, the method further comprising:
receiving, by the second TRP, an invoke indication transmitted by the first TRP, the invoke indication being used for invoking the second TRP to transmit interference information of the first cell in at least one target transmission resource pool; and
wherein transmitting, by the second TRP, the interference information of the first cell to a first TRP comprises:
transmitting, by the second TRP, the interference information of the first cell in each of the at least one target transmission resource pool to the first TRP according to the invoke indication, wherein the interference information of the potential interference cell in the target transmission resource pool comprises at least one of: duplex mode information of the potential interference cell in the target transmission resource pool, multiple access scheme information of the potential interference cell in the target transmission resource pool, a physical layer parameter of the potential interference cell in the target transmission resource pool, and resource allocation information of the potential interference cell in the target transmission resource pool.

* * * * *